United States Patent [19]
Adams

[11] 3,975,964
[45] Aug. 24, 1976

[54] CONSTANT SPEED DRIVE

[75] Inventor: Frederick John Adams, Campton, England

[73] Assignee: Cam Gears Limited, Hitchin, England

[22] Filed: Nov. 27, 1974

[21] Appl. No.: 527,539

[52] U.S. Cl. .................. 74/230.17 A; 74/230.17 E
[51] Int. Cl.² ........................................ F16H 55/52
[58] Field of Search ............ 74/230.17 E, 230.17 C, 74/230.17 B, 230.17 M, 217 CV, 336 B, 230.17 A

[56] References Cited
UNITED STATES PATENTS

| | | | |
|---|---|---|---|
| 2,678,566 | 5/1954 | Oehrli | 74/230.17 E |
| 2,987,934 | 6/1961 | Thomas | 74/230.17 E |
| 3,045,773 | 7/1962 | Sampietro | 74/230.17 E |
| 3,362,242 | 1/1968 | Watkins | 74/230.17 E |
| 3,499,341 | 3/1970 | Landau | 74/230.17 C |
| 3,727,478 | 4/1973 | Erickson et al. | 74/230.17 E |
| 3,777,583 | 12/1973 | Talbot | 74/230.17 E |
| 3,866,487 | 2/1975 | Key | 74/230.17 E |
| 3,916,707 | 11/1975 | Wells | 74/230.17 E |

Primary Examiner—Samuel Scott
Assistant Examiner—A. Russell Burke

[57] ABSTRACT

A constant speed belt drive system includes a belt connecting a drive V-pulley to a driven V-pulley. Each pulley comprises a pair of axially displaceable half-sheaves. One pulley has a half-sheave which is axially displaceable by biasing spring means; the other pulley has a half-sheave which is axially displaceable by centrifugal movement of balls riding on ramp means between the half-sheaves. In operation, the balls are located at their radially innermost positions when the system is running at a predetermined drive speed. Upon increase of speed of the system above the predetermined speed, the balls are displaced radially outwardly along their ramps under centrifugal force and axially displace the pulley half-sheaves effecting thereby a change in the speed ratio between the driving and driven pulley. Either the ramp means or the spring biasing means or both are arranged to provide a non-linear rate of axial displacement of the half-sheaves and consequent non-linear rate of speed ratio change. In the case of the ramp means, the non-linear rate is attained by forming the ramp means with two surfaces of different inclination to the pulley axis of rotation. In the case of the spring biasing means, the non-linear rate is by providing sequentially acting springs of different spring rates.

15 Claims, 9 Drawing Figures

CONSTANT SPEED DRIVE

This invention relates to a belt drive system comprising a first V-pulley connectable by a belt to a second V-pulley, in which one of the pulleys is mountable on a variable speed drive shaft while the other one is mounted on a driven shaft, in which each of the pulleys comprises a pair of half-sheaves at least one of which is axially movable relative to the other, and in which the, or a, movable half-sheave of the first pulley is subject to axial bias in one direction and the, or a, movable half-sheave of the second pulley is subject to equal bias in the opposite direction so that the two pulleys provide a belt supporting surface of predetermined circumferential length and hence a predetermined drive speed for the system when the belt is normally tensioned between them. Such a system will hereinafter be referred to "as of the type described".

Experiments with the belt drive system of the type described have shown that, as desired, the ratio of driving speed to driven speed (sometimes hereinafter referred to as the "speed ratio") varies, within the operating range of the system, linearly if the biasing force acting on the displaceable half-sheave of the first pulley and that acting on the displaceable half-sheave of the second pulley are in balance. This is the case with the drive system described and claimed in Applicants' U.K. Patent No. 1,297,574 in which the movable half-sheave of the first pulley is axially displaceable relative to its other half-sheave by axially biasing spring means while the movable half-sheave of the second pulley is axially movable by fluid-pressure actuated means controlled by a centrifugally operable speed-sensing device. This is also the case with the system known from U.K. Patent No. 892,609 in which the movable half-sheave of the driven pulley is axially movable relative to its other half-sheave by balls which upon an increase of the speed above a predetermined one are displaced radially outwardly by increased centrifugal force. However, it may be desirable, for certain applications, for the operating range of the system to include a non-linear variation of the speed ratio.

The invention aims at making such a system available and accordingly provides a belt-drive system of the type described, wherein a movable half-sheave of one of the pulleys is axially displaceable relative to its other half-sheave by axially biasing spring means and a movable half-sheave of the other pulley is axially displaceable relative to its other half-sheave by radially displaceable balls riding over ramp means associated with a radially extending guide face of the movable half-sheave axially remote from its end face which opposes an end face of the other half-sheave, wherein the balls are located at their radially innermost positions when the system is running at the predetermined drive speed so that upon increase of speed of the system above the predetermined one the balls are displaced radially outwardly under centrifugal force as a result of which the axial distance between the movable half-sheave of the other pulley and its other half-sheave willl be changed and the circumferential length of the belt supporting surface correspondingly changed, and the resulting changed tension on the belt will cause the movable half-sheave of the one pulley to be moved relative to its bias so as temporarily to provide a belt supporting surface of different size than the predetermined one and wherein at least one of said spring means and ramp means provides non-linear rating for the axial displacement of the movable half-sheaves and resultant non-linear rate of speed ratio change so that the axial displacement (and speed ratio change) is at a first substantially constant rate for a predetermined extent thereof and is at a second and different substantially constant rate for a subsequent predetermined extent of such displacement. The non-linear variation of the speed ratio within the operating range of the system may be obtained by varying the force at which the movable half-sheave of the one pulley is biased against the stationary half-sheave thereof and may also or alternatively be obtained by varying the ramp means so that the resistance to radial displacement of the balls differs over at least two parts of the predetermined allowable ball displacement on the ramp means, for example, the slope, or profile, of the ramp on the end face of the movable half-sheave of the second pulley may undergo a change in its angle of inclination relative to the axis of the pulley within the extent of the ramp means over which the balls can be displaced.

In one embodiment, the invention makes available a system of the type described in which, upon the radially outward displacement of the balls, the axial distance between the movable half-sheave of the other pulley (the ball-displacable pulley) and its other half-sheave will be reduced and the circumferential length of the belt supporting surface increased, and the resulting increased tension on the belt will cause the movable half-sheave of the one pulley to be moved against its bias so as temporarily to provide a belt supporting surface smaller than the predetermined one. In an alternative embodiment, the invention makes available a system of the type described in which, upon the radially outward displacement of the balls, the movable half-sheave of the other pulley (the ball-displacable pulley) and its other half-sheave will be increased, and the resulting decreased tension on the belt will cause the movable half-sheave of the one pulley to be moved by its biasing spring in the direction with its bias so as temporarily to provide a belt supporting surface larger than the predetermined one.

In order to make the invention more easily understood and to explain some further features, some embodiments thereof will now be described in more detail with reference to the accompanying drawings, in which:

FIG. 1 shows a conventional drive system of the type described;

FIG. 2 shows one embodiment of a drive system according to the invention including a driving pulley mountable on a variable speed drive shaft and having a movable half-sheave axially displaceable under the bias of a coil spring, and a driven pulley mounted on a driven shaft and having a movable half-sheave axially displaceable under the bias of steel balls which under centrifugal force travel over a ramp on a guide face of the half-sheave remote from the other half-sheave, the ramp having two portions inclined at different angles to the pulley axis;

Figure 1:
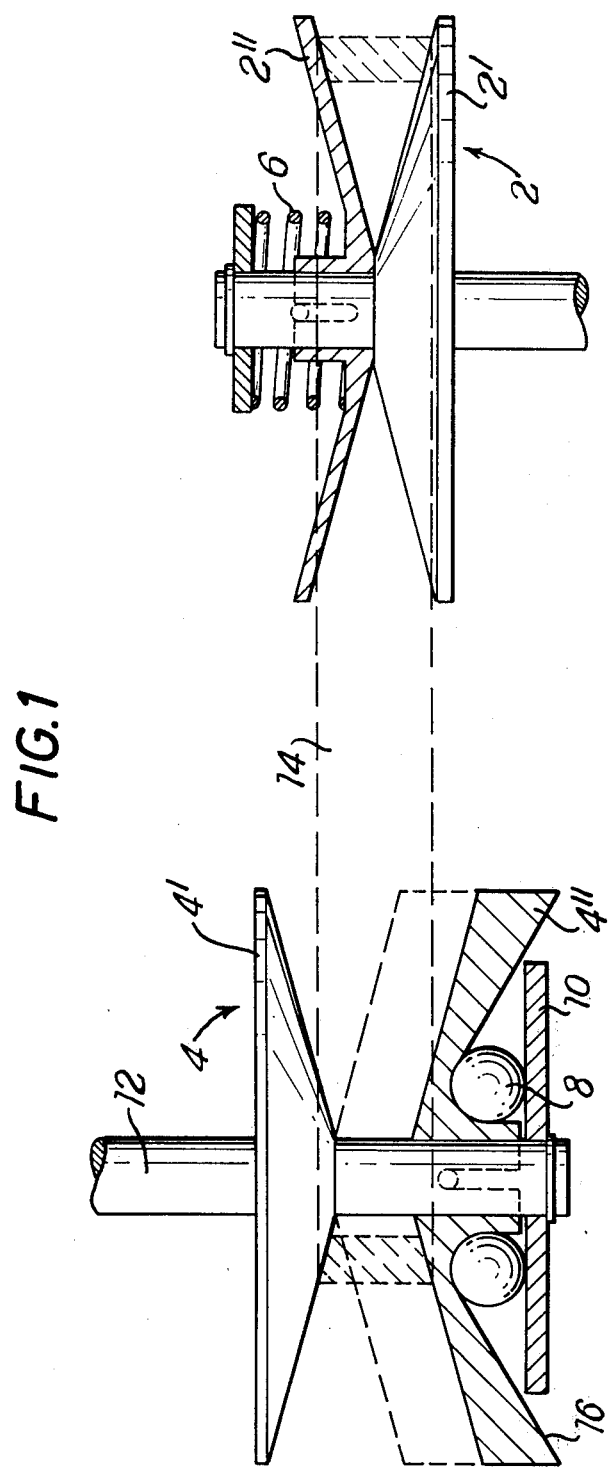
Figure 2:
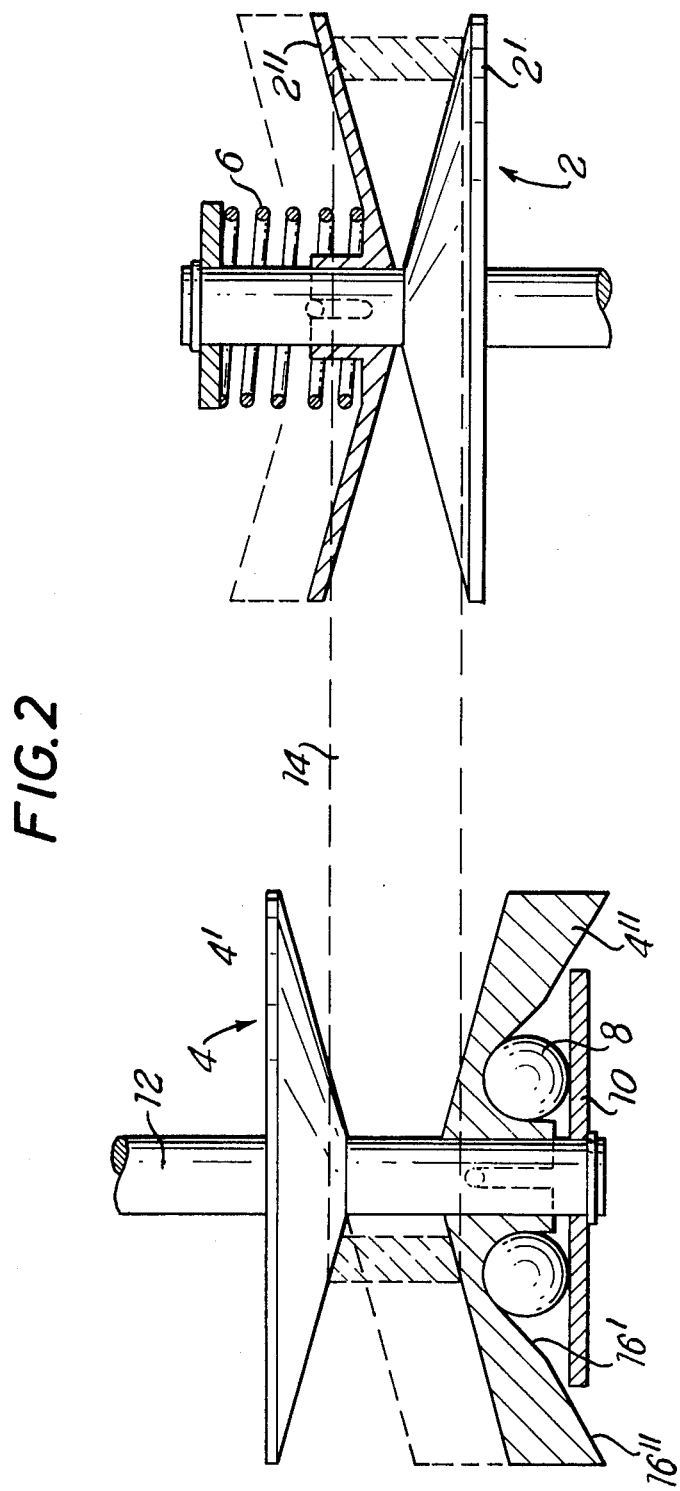
Figure 3:
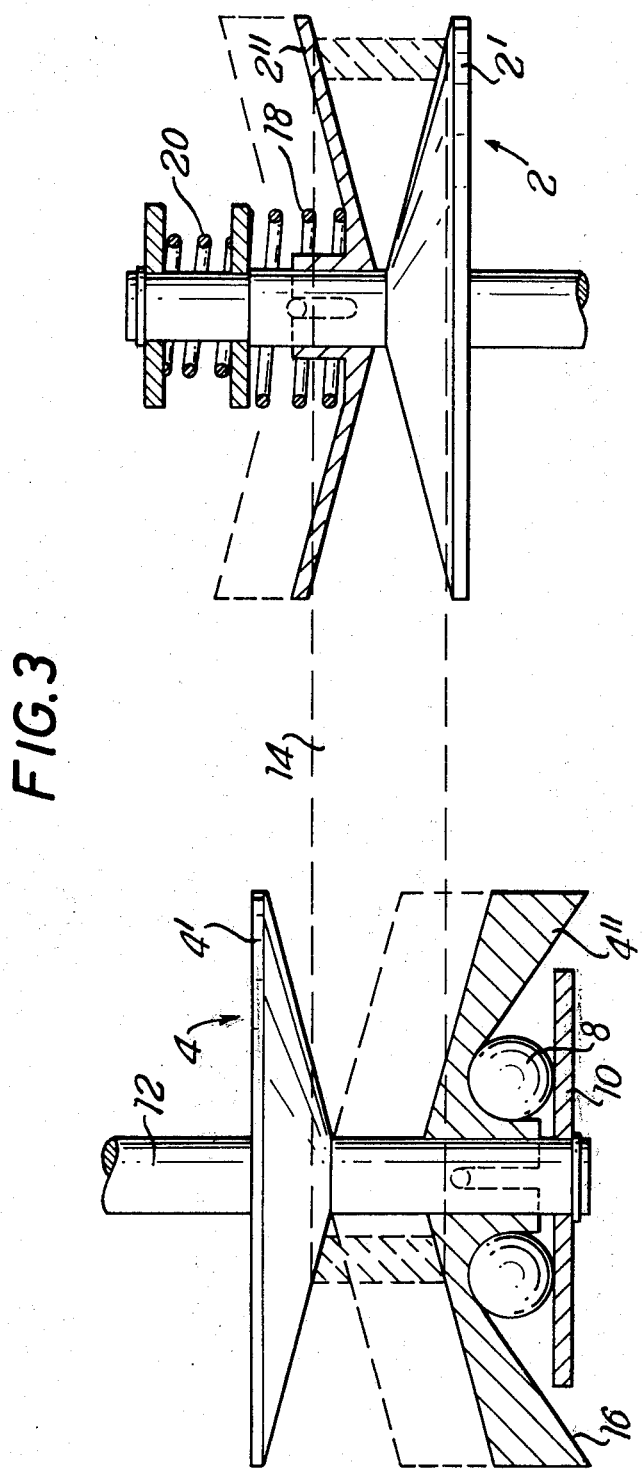
FIG. 3 shows a further embodiment according to the invention in which the movable half-sheave of the pulley mountable on the drive shaft is axially biased by two differently rated coil springs.
Figure 4:
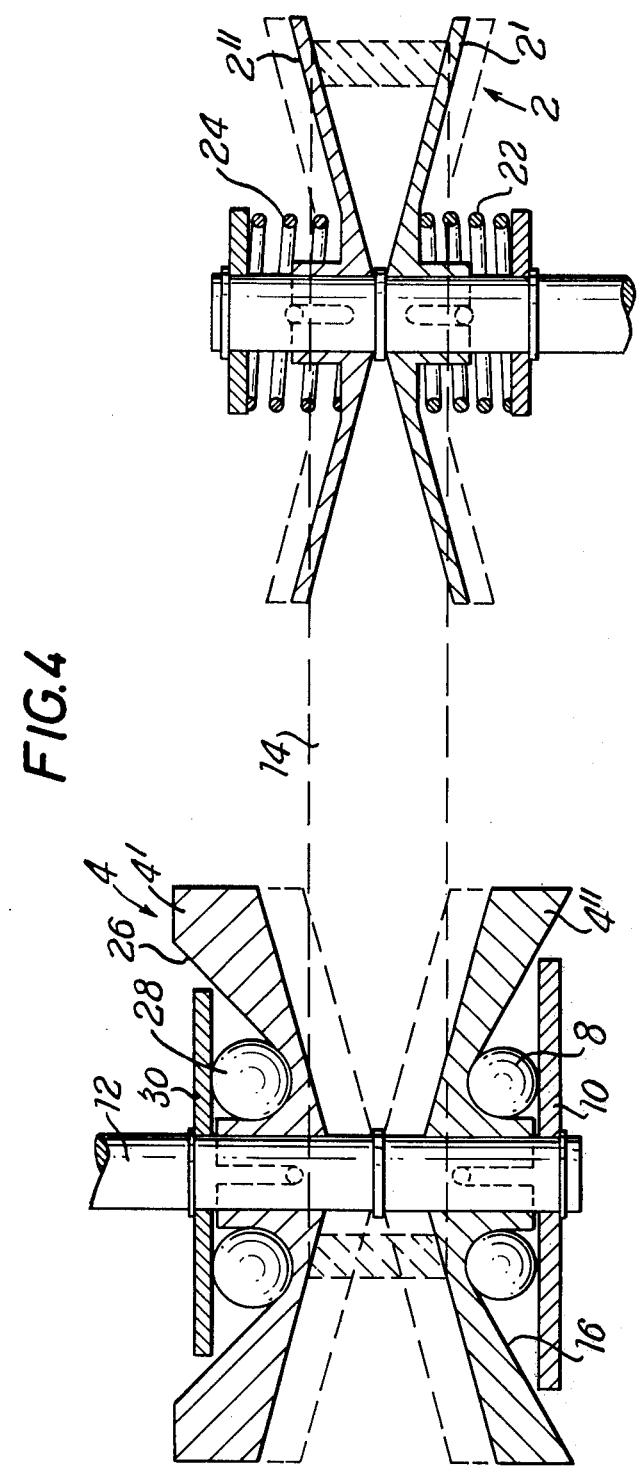
FIG. 4 shows a still further embodiment of the invention in which each of the half-sheaves of both pulleys is axially displaceable.
Figure 5:
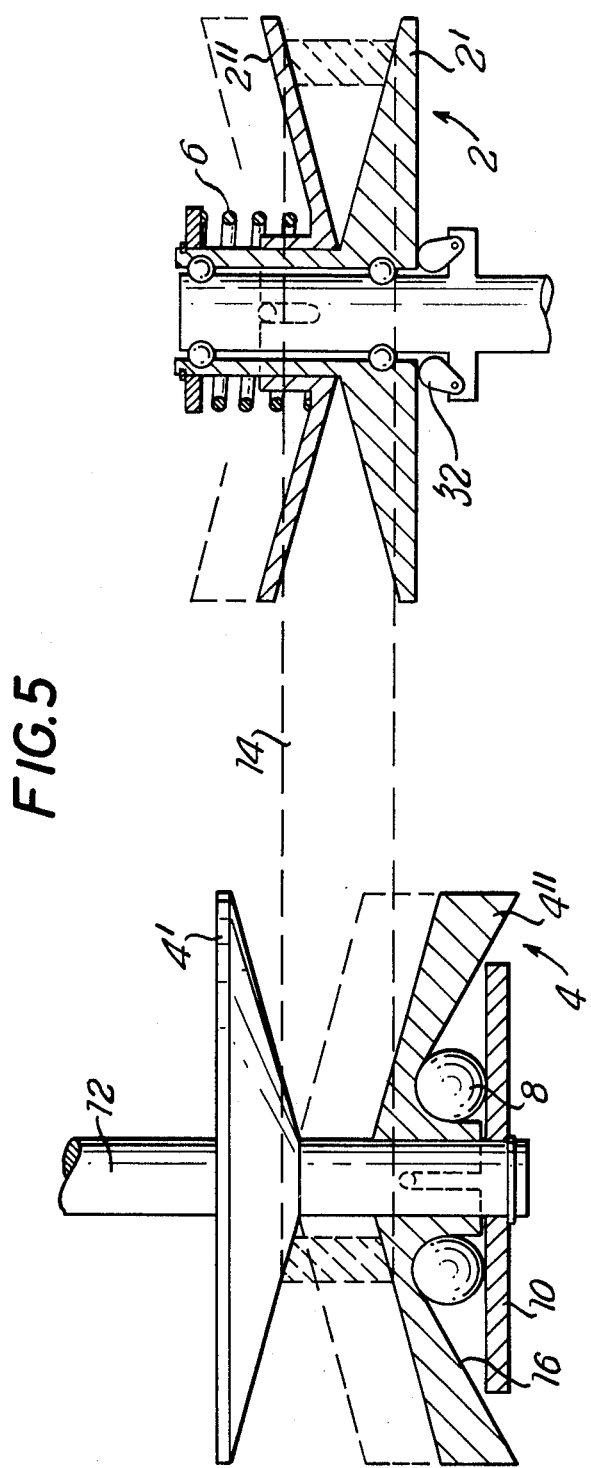
FIG. 5 shows yet another embodiment of the invention in which incorporating a centrifugally operable clutch.
Figure 6:
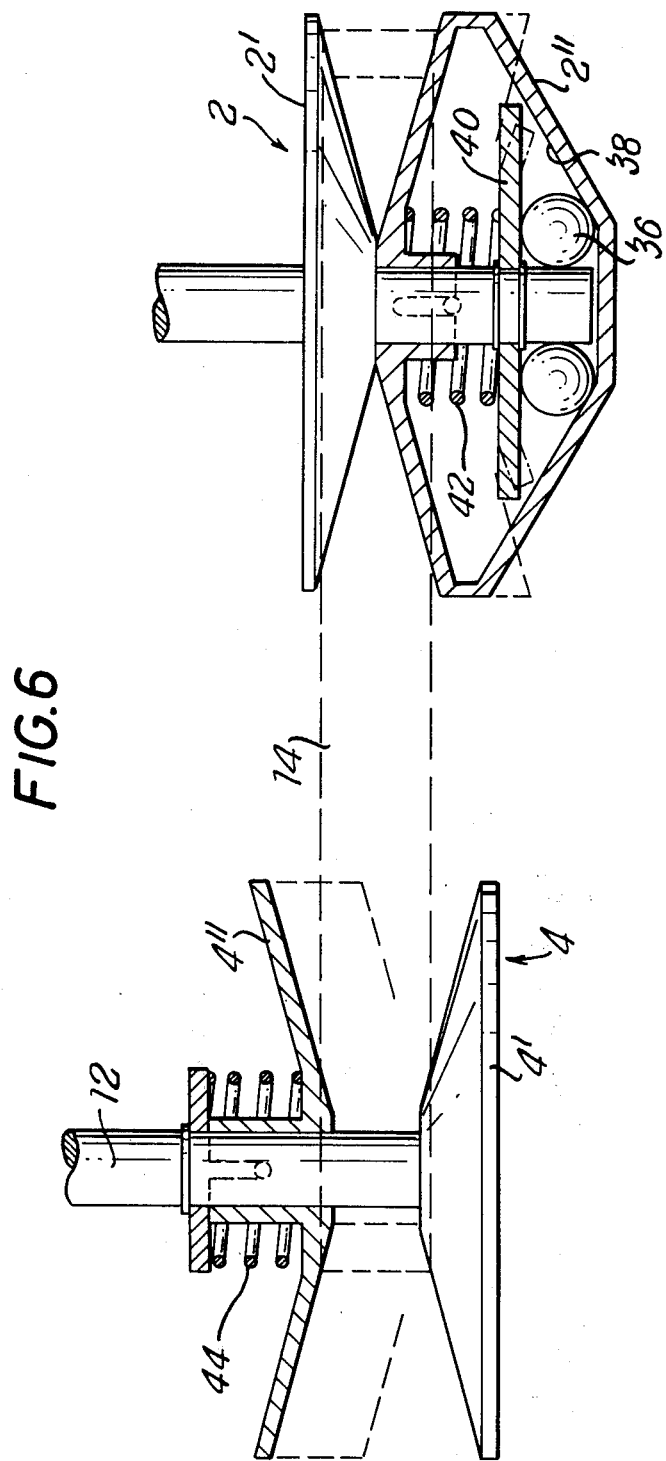
Figure 7:
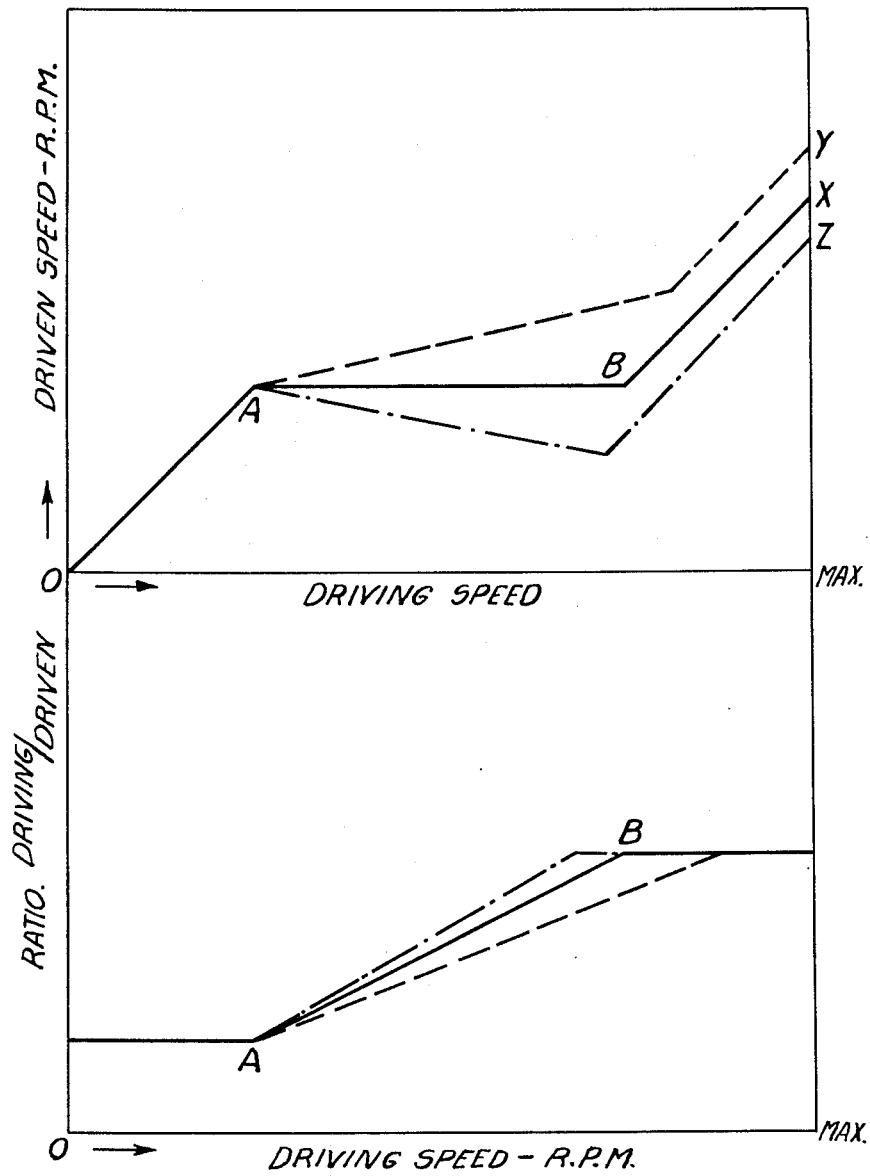
Figure 8:
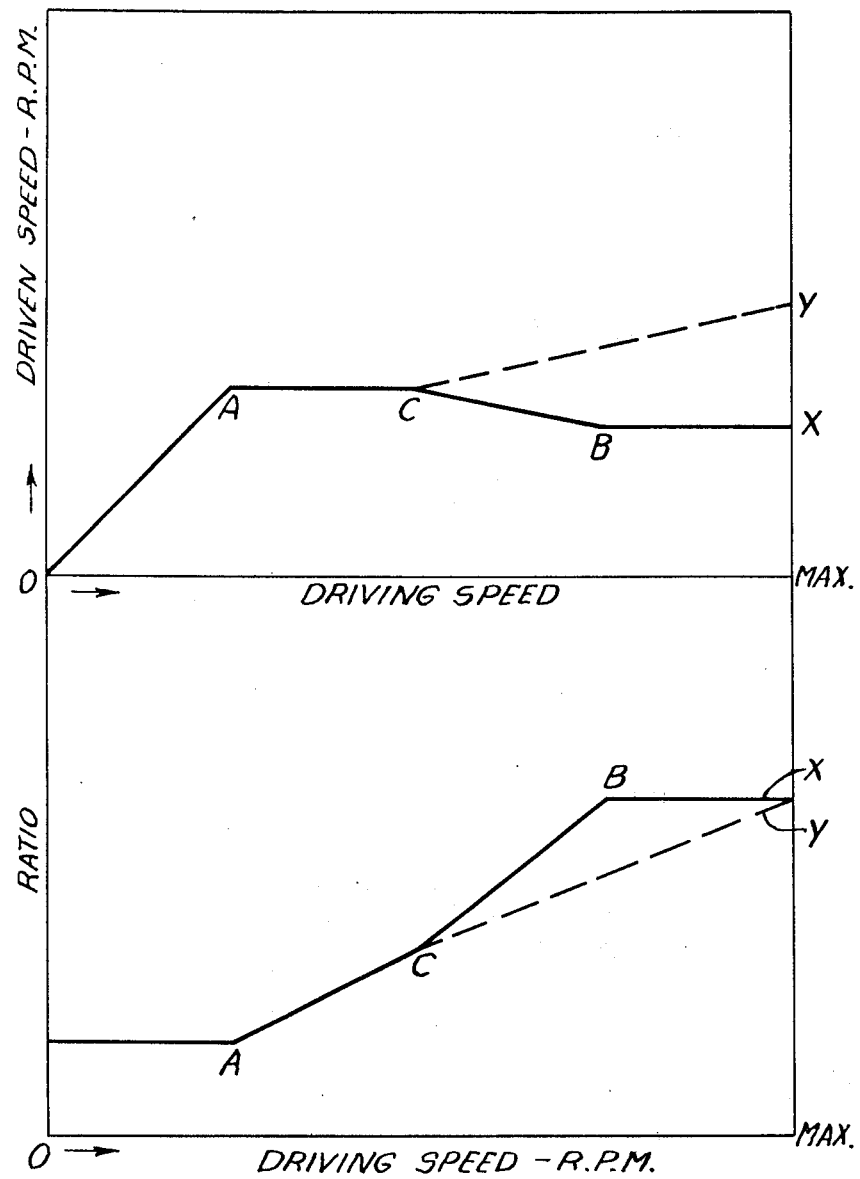
Figure 9:
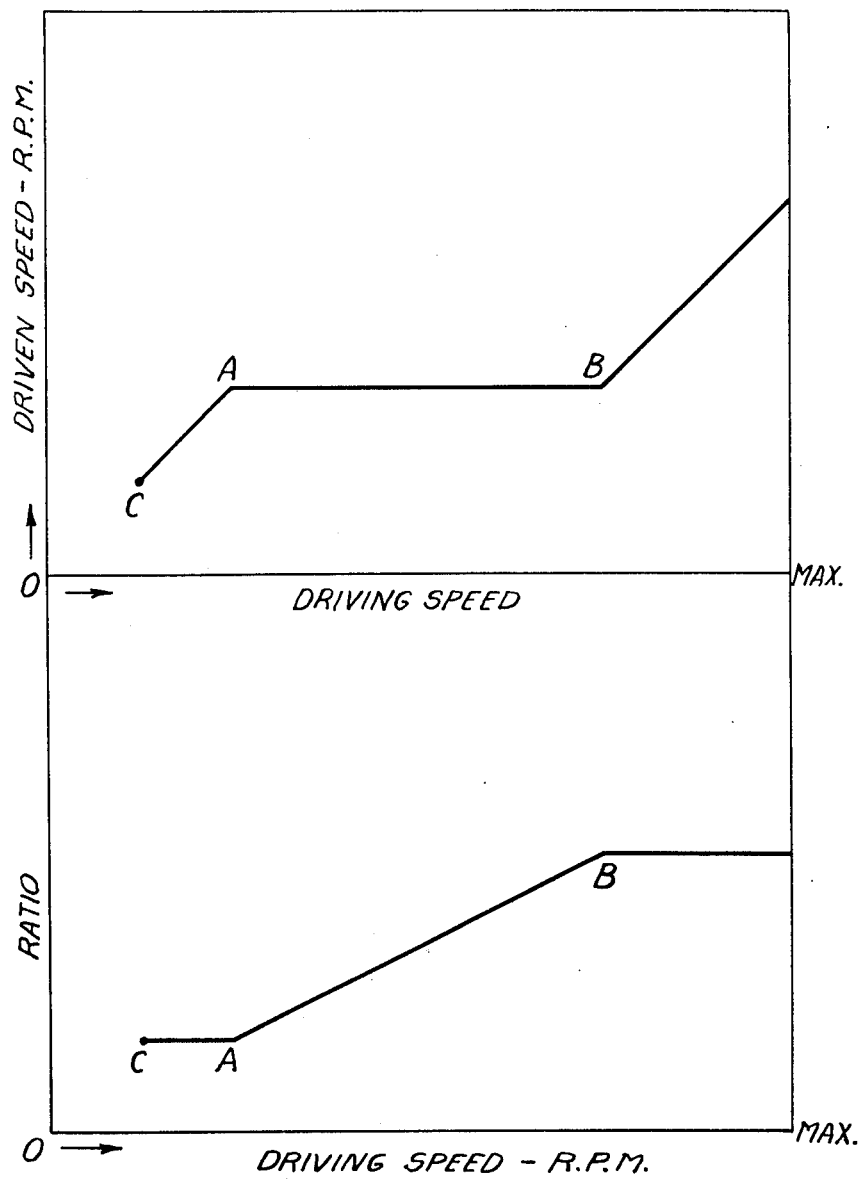

FIG. 6 shows an embodiment in which the movable half-sheave of the driving pulley is biased by steel balls while the movable half-sheave of the driven pulley is biased by a coil spring; and FIGS. 7 to 9 are diagrams the lower one of each Figure showing the theoretical change of the transmission ratio in relation to the change of driving speed and the upper one of each Figure showing the relationship between driven speed and driving speed respectively, the diagrams in FIG. 7 appertaining to the embodiment illustrated in FIG. 1, those in FIG. 8 to the embodiments illustrated in FIGS. 2, 3 and 4 respectively and those in FIG. 9 to the embodiment illustrated in FIG. 5.

Turning now to the known system illustrated in FIG. 1, this comprises a driving pulley 2 and a driven pulley 4. Both pulleys include a stationary half-sheave 2' and 4' respectively and an axially movable half-sheave 2" and 4" respectively. The axially movable half-sheave 2" is biased against its associated stationary half-sheave 2' by means of a helical coil spring 6 while the movable half-sheave 4" of the driven pulley is movable against its associated stationary half-sheave under the force of steel balls 8 disposed in radial guide channels — not shown — provided in the end face of the half-sheave 4" remote from the half-sheave 4'. The steel balls are retained in their respective guide channels by means of a retainer plate 10 mounted on the driven shaft 12 for rotation therewith. The two pulleys 2 and 4 are connected by a V-belt 14. The driving pulley 2 in the embodiment illustrated in this drawing is, when stationary or rotating at idling speeds, in its fully closed position since the force of the spring 6 biases the half-sheave 2" into engagement with the half-sheave 2'. In this position the pulley 2 provides its maximum belt supporting surface. In contrast, the half-sheave 4" is spaced at maximum distance from the half-sheave 4', when the pulley 4 is stationary or driven at idling speeds, thus providing its minimum belt supporting surface so that the system provides in this condition a maximum step-up ratio. The pulley will remain in this condition until the speed of rotation of the driven pulley 4 is sufficiently great so that the radial component of the centrifugal force generated by the balls 8 overcomes the selected rate or stiffness of the spring 6. Upon reaching this speed the half-sheave 4" will be axially displaced towards the stationary half-sheave 4' as a result of which the circumferential length of the belt supporting surface of this pulley will be increased, which increase will increase the tension on the belt which in turn will cause the half-sheave 2" of the driving pulley to be axially displaced away from the half-sheave 2' so that the transmission between the two pulleys which at idling speeds was at a step-up ratio will be reduced to a 1—1 ratio or upon further movement of the balls 8 into a step-down ratio. This ratio change will continue until the maximum displacement of the two movable half-sheaves is reached and, at speeds above this the system will remain at its maximum step-down ratio. It will be observed that throughout their travel the balls ride along a ramp 16 on the outer end, or guiide, face on the half-sheave 4' which ramp extends along a constant angle. Assuming the spring rate of the spring 6 to be constant, the ratio change will be linearly proportional to the speed. This will be evident from a consideration of the two diagrams shown in FIG. 7. The ratio remains constant until the speed of the pulleys has reached a point A at which the centrifugal force of the balls starts to overcome the force of the spring 6. Thereafter, as the driving speed increases, the ratio changes linearly until a point B is reached at which the balls have reached the limit of their travel. The broken lines in the lower diagram indicate the variations that can be produced by increasing or decreasing the rate or stiffness of the spring 6. The point A in this diagram represents the point at which the ball forces begin to balance the filled load, of the spring 6. The upper diagram indicates that the speed of the driven pulley remains constant between the points A and B in spite of an increase of the speed of the driving pulley. If the spring rate is reduced, as indicated by the dash-dotted line Z, the system will over-correct and the speed of the driven pulley be reduced. If the rate or stiffness of the spring 6 is increased, as indicated by the broken line Y, the speed of the driven pulley will increase linearly since the system under-corrects.

In contrast to the constant angle along the ramp 16 of the pulley 4 in the embodiment illustrated in FIG. 1, the radially inner ramp portion 16' in FIG. 2 extends at a first, comparatively steep, angle — i.e., the included angle between the rotary axis and the end face of the half-sheave 4" provided with the guide channels — until it reaches a point C and extends from the point C onwards with its radially outer portion 16" at a second, increased, angle. The result of this arrangement is that with increasing speed the half-sheave 4" will be moved towards the stationary half-sheave 4' at a first substantially constant rate while the balls travel under centrifugal force along the ramp portion 16' but at a second but different substantially constant rate while they travel along the portion 16". The diagrams in FIG. 8 illustrate this change, the full lines X showing the changes of ratio and of driven speed respectively that occur if the slope angle, or profile, of the ramp portion 16' is greater than that of the ramp portion 16". It will be observed that the transmission ratio is constant until the point A is reached. Between points A and C axial displacement of the movable half-sheaves and the resultant change of speed ratio will be along a first line while the speed of the driven pulley will remain constant; between the points C and B the transmission ratio will change — stepped down — along a second line and the speed of the pulley 4 will decrease. It is feasible for the ramp portion 16" to extend at a smaller angle than the ramp portion 16' the effects of which are indicated by the broken lines Y. It is also feasible, although not illustrated, for the guide channels in the ramp portion 16' to extend radially outwards and to change direction at the point C in such a fashion that they extend in the portion 16" along arcuate paths the end section of each of which remote from the point C is substantially concentric with the peripheral edge of the half-sheave 4", or substantially tangential relative to the axis of rotation.

Instead of the ramp extending along two different angles a similar result can be achieved by using two helical coil springs 18 and 20 on the driving pulley 2 as illustrated in FIG. 3. In this embodiment the ramp 16 of the driven pulley 4 extends along a constant angle but the two springs 18 and 20 are of a different spring rate or stiffness. The effect of this arrangement is that the lighter spring will deflect first and produce one rate of ratio change. At a predetermined point the second spring will start to deflect giving a second rate change of the transmission ratio.

A further embodiment of the invention is illustrated in FIG. 4 in which both half-sheaves of each of the pulleys 2 and 4 are axially displaceable. As in the case of the previously described embodiments, the pulley 2 is biased by coil springs 22 and 24 the former biasing the half-sheave 2' towards the half-sheave 2'' and the latter biasing the half-sheave 2'' towards the half-sheave 2'. The two coil springs 22 and 24 are pretensioned at different loads. The half-sheave 4'' of the pulley 4 is again movable towards the half-sheave 4' under the bias of the steel balls 8. The half-sheave 4' at its end, or guide, face remote from the half-sheave 4'' is also provided with guide channels — not shown — along a ramp 26 in which steel balls 28 travel under centrifugal force. The steel balls 28 are retained in their guide channels by a retainer plate 30. It will be observed that the angle along which the ramp 26 extends differs from that of the ramp 16. As a result of this arrangement, one of the two half-sheaves 4' and 4'' will move first, i.e., will be axially displaced towards its other half sheave, and in doing so cause the half-sheave with the lightest spring tensioning of the pulley 2 to move substantially simultaneously axially away from its other half-sheave. When these respective half-sheaves have reached the end of their axial displacement an increase of speed will cause the second of the half-sheaves of the pulley 4 to be axially displaced causing in turn a corresponding axial displacement of the second half-sheave of the pulley 2.

It will be desirable in some instances to have no transmission at all between the driving and the driven pulley at low speeds, and this can be achieved by incorporating into the driving pulley 2 a centrifugally operable clutch 32 as illustrated in FIG. 5. At speeds below that at which the clutch 32 becomes operative the pulley 2 will freewheel in its bearings. At and above the operative speed of the clutch the transmission will operate similarly to the one described with reference to FIG. 1 — if the ramp of the half-sheave 4'' is constructed in the same manner as described in connection therewith. It is to be understood, however, that the embodiments illustrated in FIGS. 2 to 4 may also be fitted with the clutch 32. The diagrams shown in FIG. 9 show the ratio change and speed of the driven pulley if otherwise the pulleys 2 and 4 are constructed as those shown in FIG. 1.

Turning finally to the embodiment illustrated in FIG. 6, it will be observed that steel balls 36 are located in guide channels — not shown — provided along the internal ramp, or guide face, 38 of the displaceable half-sheave 2''. The balls 36 are retained in their respective guide channels by a retainer plate 40 mounted on the driving shaft, being rotated therewith and disposed in a hollow space formed by the ramp 38 and the end face of the half-sheave 2'' closest to the half-sheave 2'. A helical coil spring 42 is mounted around the driving shaft in the hollow space on the side of the retainer plate 40 remote from the steel balls 36. The half-sheave 2'' is again biased towards the half-sheave 2' by the coil spring 42 when the pulley rotates at low speeds but will be balanced and over-ridden when at increased speeds the steel balls 36 travel under centrifugal force along the ramp 38. The moveable half-sheave 4' of the driven pulley 4 is biased towards the stationary half-sheave 4' by a coil spring 44, and the filled load of the spring 42 is greater than that of the spring 44. The ramp 38 in the embodiment illustrated is shown to extend along a constant angle but may extend at two different angles as described in connection with the previous embodiments. Alternatively, and as shown in this Figure, the retainer plate 40 instead of being flat can comprise a radially inner portion which is flat and a radially outer portion angularly inclined relatively to the inner portion. The effect of such an arrangement is the same as if the profile of the ramp is varied.

What is claimed is:

1. A belt-drive system comprises a driving pulley and a driven pulley connected by a belt, each pulley comprising two half-sheaves having opposed faces so that the two pulleys cooperate to provide a belt supporting surface of predetermined circumferential length when the belt is normally tensioned between them, wherein a movable half-sheave of one of the pulleys is axially displaceable relative to its other half-sheave by axially biasing spring means and a movable half-sheave of the other pulley is axially displaceable relative to its other half-sheave by radially displaceable balls riding over ramp means associated with a radially extending guide face of the movable half-sheave axially remote from its end face which opposes an end face of its other half-sheave, wherein the balls are located at their radially innermost positions when the system is running at a predetermined drive speed so that upon increase of speed of the system above the predetermined one the balls are displaced radially outwardly under centrifugal force as a result of which the axial distance between the movable half-sheave of the other pulley and its other half-sheave will be changed and the circumferential length of the belt supporting surface correspondingly changed, and the resulting changed tension on the belt will cause the movable half-sheave of the one pulley to be moved relative to its bias so as temporarily to provide a belt supporting surface of different size than the predetermined one, whereby the speed ratio between the driving pulley and the driven pulley is changed, and wherein said spring means and said ramp means coact to provide a non-linear rate of axial displacement of the movable half-sheaves and consequent non-linear rate of speed ratio change so that the axial displacement and speed ratio change is at a first substantially constant rate for a predetermined extent thereof and is at a second and different substantially constant rate for a subsequent predetermined extent of such displacement.

2. A system according to claim 1 wherein upon said radially outward displacement of said balls, the axial distance between the movable half-sheave of the other pulley and its other half-sheave will be increased and the circumferential length of the belt supporting surface decreased, and the resulting decreased tension on the belt will cause the movable half-sheave of the one pulley to be moved by its biasing spring means with its bias so as temporarily to provide a belt supporting surface larger than the predetermined one, whereby the speed ratio between the driving pulley and the driven pulley is changed.

3. A system according to claim 2 wherein the balls are retained within their ramp means by a retainer plate against which a movable half-sheave of the other pulley is axially biased by a spring means.

4. A system according to claim 3 wherein the retainer plate has a radially inner portion which is flat and a radially outer portion which is angularly inclined relative to the inner portion.

5. A system according to claim 1 wherein upon said radially outward displacement of said balls, the axial distance between the movable half-sheave of the other pulley and its other half-sheave will be reduced and the circumferential length of the belt supporting surface increased, and the resulting increased tension on the belt will cause the movable half-sheave of the one pulley to be moved against its bias so as temporarily to provide a belt supporting surface smaller than the predetermined one, whereby the speed ratio between the driving pulley and the driven pulley is changed.

6. A system according to claim 5, wherein the non-linear rate of axial displacement and speed ratio change is produced by varying the force of the spring means.

7. A system according to claim 6, wherein the spring means comprise two coil springs of different rates, and wherein the arrangement is such that the one spring upon being subjected to a first predetermined load will be deflected to produce a first rate of axial displacement and speed ratio change and that the second spring upon being subjected to a second predetermined load greater than the first one will be deflected to produce a second rate of axial displacement and speed ratio change.

8. A system according to claim 5, wherein the non-linear rate of axial displacement and speed ratio change is produced by varying the profile of the ramp means.

9. A system according to claim 8, wherein the variation of the profile comprises arranging the radially inner portion of the remote end face of the movable half-sheave at an angle of inclination relative to the axis of the pulley different from that of the radially outer portion.

10. A system according to claim 9, wherein the angle of inclination of the radially inner portion is smaller than that of the outer portion.

11. A system according to claim 5, wherein the ramp means comprise guide channels along which the balls are arranged to travel.

12. A system according to claim 11 wherein each guide channel comprises an arcuate path portion which progresses radially outwardly from a substantially radial direction to a substantially tangential direction relative to the axis of rotation.

13. A system according to claim 5, wherein each half-sheave of each of the pulleys is axially displaceable from its other half-sheave, wherein the spring means comprise two springs of different rates each biasing a respective one of the two half-sheaves of the one pulley, wherein the ramp means comprise separate ramps provided, respectively, at the remote oppositely facing end faces of the half-sheaves of the other pulley and extending at two different angles of inclination relative to the pulley axis, balls being associated with each of the ramps, and wherein the arrangement is such that when in operation the balls associated with the ramp of greatest inclination are centrifugally driven outwardly their associated half-sheave will be axially displaced and substantially simultaneously the half-sheave of the one pulley biased by the lightest-rated spring will be correspondingly axially displaced, and that thereafter when the balls associated with the ramp of least inclination are driven outwardly their associated half-sheave will be axially displaced and substantially simultaneously the half-sheave of the one pulley biased by the higher-rated spring will be correspondingly axially displaced.

14. A system according to claim 9 wherein the two springs are coil springs.

15. A system according to claim 5, wherein the pulley mountable on the driving shaft is provided with a centrifugally operable clutch arranged to prevent transmission of rotary motion at driving speeds below the predetermined one and to permit transmission at or above the predetermined one.

* * * * *

UNITED STATES PATENT OFFICE
CERTIFICATE OF CORRECTION

Patent No. 3,975,964  Dated August 24, 1976

Inventor(s) Frederick John Adams

It is certified that error appears in the above-identified patent and that said Letters Patent are hereby corrected as shown below:

Claim 2, line 3, change the word "other" to read --one--.

Claim 5, line 3, change the word "other" to read --one--.

Signed and Sealed this

Thirtieth Day of November 1976

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,975,964      Dated August 24, 1976

Inventor(s) Frederick John Adams

It is certified that error appears in the above-identified patent and that said Letters Patent are hereby corrected as shown below:

Column 8, line 31, change "9" to --13--.

Signed and Sealed this

Eighteenth Day of January 1977

[SEAL]

Attest:

RUTH C. MASON
*Attesting Officer*

C. MARSHALL DANN
*Commissioner of Patents and Trademarks*